UNITED STATES PATENT OFFICE.

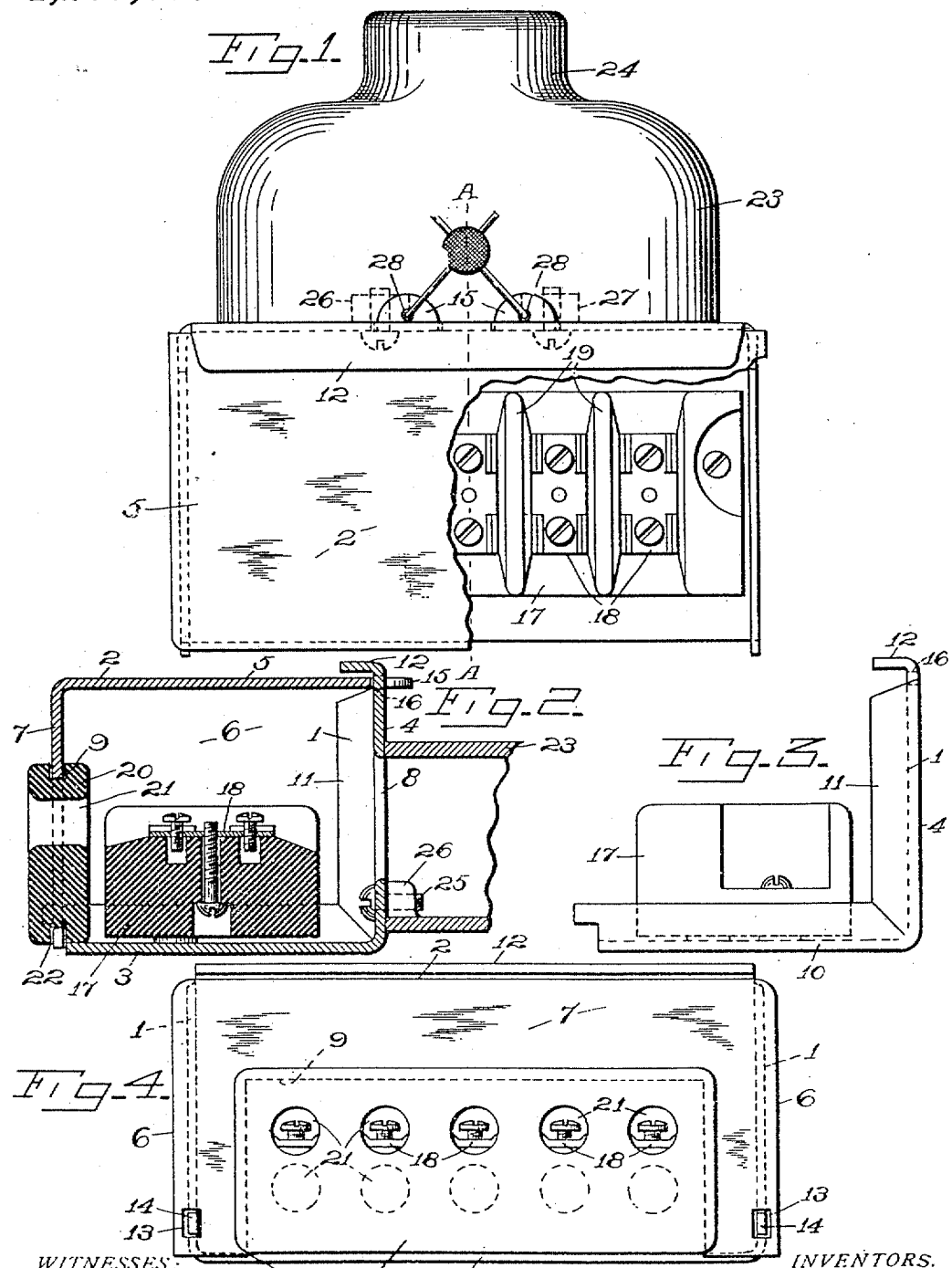

CARL H. BISSELL AND JOHN J. DOSSERT, OF SYRACUSE, NEW YORK, ASSIGNORS TO CROUSE-HINDS COMPANY, OF SYRACUSE, NEW YORK, A CORPORATION OF NEW YORK.

ELECTRICAL CONNECTION AND BOX.

1,234,857.  Specification of Letters Patent.  Patented July 31, 1917.

Application filed July 27, 1914. Serial No. 853,309.

*To all whom it may concern:*

Be it known that we, CARL H. BISSELL and JOHN J. DOSSERT, citizens of the United States, and residents of Syracuse, in the county of Onondaga and State of New York, have invented a certain new and useful Electrical Connection and Box, of which the following is a specification.

This invention has for its object the production of an electrical connection and box therefor, especially applicable for use in connection with a meter; and the invention consists in the novel features of construction hereinafter set forth and claimed.

In describing this invention, reference is had to the accompanying drawings, in which like characters designate corresponding parts in all the views.

Figure 1 is a plan, partly broken away, of a preferable form of this box.

Fig. 2 is a section on line A—A, Fig. 1, partly broken away.

Fig. 3 is an end elevation of the lower section of the box, the conduit outlet connection being removed.

Fig. 4 is a front elevation looking to the right in Fig. 2, the positions of the wire holes when the entrance piece is reversed being indicated in dotted lines.

This invention includes, generally, a box and an electrical connection located in the box and having terminals on its upper face, and a closure for the open side of the box having holes alined with the terminals of the connection.

As here shown, the box is formed with openings in opposing sides thereof and means for connection with the electrical conduit is mounted on one of said sides in communication with the opening therein, and the closure is located in position to close the opening in the opposite side.

As here shown, the box comprises, two metallic sections 1, 2, one a body including a bottom 3 and one of the sides 4 of the box and the other a cap including the top 5, the two ends 6 and the remaining side 7 of the box, which side 7 is opposed to the side 4 of the section 1, the sides 4 and 7 being formed with elongated openings 8, 9 therein, the opening 9 of the side 7 opening through the lower edge of the side 7 which edge meets the bottom 3.

The bottom 3 and side 4 are formed with inturned marginal flanges 10, 11 located at the ends of the bottom and the side 4, and the side 4 is formed at its upper edge with an inturned flange 12, the flanges 11 and 12 being cut away at the upper corners of the side 4. The ends 6 of the cap section 2 overlie the flanges 10, 11, while the margin of the top wall extends under the flange 12, and the upper corner portions at the advance side of the cap portion extend between the ends of the flanges 11, 12. The sections are formed with interfitting tongues and slots, and as here shown, the wall 7 is formed with slots 13 near its lower edge and at opposite ends of the opening 9, and the end flanges 10 of the bottom are formed with tongues 14 at their free ends which fit into the slots 13, while the top 5 is formed with tongues 15 at its free advance margin which fit into the slots 16 formed in the wall 4 near the upper edge thereof beneath the flange 12.

17 is the electrical connection mounted on the bottom 3 in any suitable manner and consisting of a base of insulation opposed to the openings 8 and 9 and having terminals 18 on its upper face which are separated by barriers 19, the terminals being arranged to be readily connected to wires extending through the openings 8 and 9.

20 is an entrance piece located in the opening 9 and forming a closure therefor and having openings 21 by which the wires can have access to the terminals 18, this entrance piece 20 being reversible top for bottom in order to change the positions of the holes 21 from the position indicated in full lines, Fig. 4, to that indicated in dotted lines, these holes being located nearer one longitudinal margin than the other. The entrance piece 20 is preferably insulated and is formed with a groove 22 in its edge arranged to receive the margin of the wall around the opening 9, as shown in Figs. 2 and 4 and be held in position thereby. When the closure is in the position shown in Fig. 2, the openings 21 thereof are alined with the terminals 18 and when the closure is in such position that the holes 21 thereof occupy the positions indicated in dotted lines Fig. 4, connection cannot be made therethrough with the terminal 18.

23 is a conduit outlet box mounted on the side 4 and alined with the opening 8 and forming a closure for the opening, this box consisting of an elongated metallic body open at the side thereof opposed to the opening 8 and having an internally threaded nipple 24 at its opposite side for connection with the conduit not shown. The box 23 is secured to the side 4 by means of screws 25 passing through lugs 26, 27 projecting into the opening 8 and provided on the interior of the box 23. Any suitable box or coupling may be substituted for the box 23.

In operation, when it is desired to make connections with the meter, the section 2 is removed and the closure detached and reversed and the wires passed through the openings 21 and connected to the terminals 18. The section 2 is then replaced and seals passed through the openings 28 in the lugs 15.

What we claim is:—

1. The combination of a box having an opening in one side and an electrical connection in the box located close to said opening and accessible therethrough and including terminals, and a reversible entrance piece located in the opening and having wire holes arranged in position to permit access to terminals of the connection within the box when said entrance piece is in one position and the holes being located out of position to permit passage of wires to the terminals of said connection when the entrance piece is in reverse position, substantially as and for the purpose described.

2. The combination of a box and an elec- and the bottom and the other a cap including two sections, one a body including a side and the bottom and the other a cap including the top, two ends and the remaining side of the box, which side is formed with an opening and is opposed to the side of the body, said opening extending through the edge of the wall meeting the bottom of the body and a closure located in said opening, substantially as and for the purpose set forth.

3. The combination of a box and an electrical connection in the box, the box including two sections, one a body including a side and the bottom and the other a cap including the top, two ends and the remaining side of the box, which side is opposed to the side of the body and is formed with an opening extending through the edge of the wall meeting the bottom of the body, and an entrance piece for said opening, the entrance piece having a groove in the edge thereof for receiving the margin of the wall around the opening and being slidable into and out of the opening when the sections are separated, substantially as and for the purpose described.

4. The combination of a box and an electrical connection in the box including a base block and terminals on the base block, the box including two sections, one a body including one side and the bottom and the other a cap including the top, two ends and the remaining side of the box which is opposed to the side of the body and which is formed with an opening extending through the edge of the wall meeting the bottom of the former section, a side of the base block being opposed to said opening and an entrance piece for said opening, the entrance piece having a groove in the edge thereof for receiving the margin of the wall around the opening and being slidable into and out of the opening when the sections are separated, and the entrance piece having wire holes located nearer one edge than the other and being reversible to change the positions of the holes relatively to the terminals of the electrical connection, substantially as and for the purpose specified.

5. The combination of a box including two sections, one a body comprising the bottom and one side and having inturned marginal flanges, and the other a cap including the top, the two ends and the remaining side of the box, which side is opposed to the side of the body, the ends of the cap overlying the end flanges of the bottom and side of the body, and the top wall underlying the flange on the side of the body, substantially as and for the purpose set forth.

6. The combination of a box including two sections, one a body comprising the bottom and one side and having inturned marginal flanges and the other a cap including the top, the two ends and the remaining side of the box, which side is opposed to the side of the body, the ends of the cap overlapping the end flanges of the bottom and side of the body and the top wall underlying the flange on the side of the body, the ends of the flanges on the side of the body being spaced apart at the corners of said side, forming corner spaces receiving corner portions of the cap, substantially as and for the purpose described.

7. The combination of a box, an electrical connection in the box, the box including two sections, one a body including a side and the bottom of the box and the other a cap including the top, two ends and the remaining side of the box, which side is opposed to the side of the body section, the sections having interfitting tongues and slots near the bottom and top, the slots all opening in the same direction and the tongues extending substantially parallel to each other, substantially as and for the purpose specified.

8. The combination of a box, an electrical connection in the box, the box including two sections one a body including the bottom and one side having inturned flanges, and the other including a cap, the two ends and the remaining side of the box which is opposed to the side of the body, the ends of the cap overlapping the end flanges of the side and bottom of the body and the margin of the top underlying the flange along the upper margin of the side of the body and the sections having interfitting tongues and slots located at the free ends of the end flanges of the bottom and the lower edge of the side of the cap, and at the edge of the top contiguous to said side of the body, substantially as and for the purpose set forth.

9. The combination of a box including two sections, one a body comprising the bottom and one side and having inturned marginal flanges, said side having an opening extending through its lower edge, and the other a cap including the top, the two ends and the remaining side of the box, which side is opposed to the side of the body, the ends of the cap overlapping the end flanges of the bottom and side of the body and the top wall underlying the flange on the side of the body, the ends of the flanges on the side of the body being spaced apart at the upper corners of said side for receiving between their ends the corner portions of the cap, and an entrance piece arranged in said opening and being reversible therein and having wire holes located nearer one edge thereof than the opposite and a groove in the edge thereof for receiving the margin of the wall around the opening therein, substantially as and for the purpose described.

10. The combination of a box, an electrical connection in the box, the box including two sections, one a body including a side and the bottom of the box and the other a cap including the top, two ends and the remaining side of the box, the side having an opening extending through its free edge which is opposed to the side of the body, the sections having interfitting tongues and slots near the bottom and at the diagonally opposite portion of the top, and an entrance piece arranged in said opening, substantially as and for the purpose specified.

11. The combination of a box, an electrical connection in the box, the box including two sections, one a body including a side and the bottom of the box, and the other a cap including the top, two ends and the remaining side of the box, the side having an opening extending through its free edge which is opposed to the side of the body, the sections being interfitting tongues and slots near the bottom and at the diagonally opposite portion of the top, and an entrance piece arranged in said opening and being reversible therein and having wire holes located nearer one edge thereof than the opposite edge, and a groove in the edge thereof for receiving the margins of the wall around the opening, substantially as and for the purpose set forth.

12. The combination of a box, an electrical connection in the box, the box including two sections, one a body including a bottom and one side having inturned flanges, the side having an opening extending through its lower edge and the other a cap including a top, the two ends and the remaining side of the box which is opposed to the side of the body, the side of the cap having an opening extending through its lower edge, the ends of the cap overlapping the end flanges of the side and bottom of the body and the free margin of the top underlying the flange along the upper margin of the side of the body, and the sections having interfitting tongues and slots located at the free ends of the end flanges of the bottom and the lower end of the side of the cap, and at the free edge of the top, and upper edge of the body, and an entrance piece arranged in said opening and being reversible therein and having wire holes located nearer one edge thereof than the opposite edge, and a groove in the edges thereof for receiving the margins of the wall around said opening, substantially as and for the purpose described.

In testimony whereof, we have hereunto signed our names in the presence of two attesting witnesses, at Syracuse, in the county of Onondaga, in the State of New York, this 24th day of June, 1914.

CARL H. BISSELL.
JOHN J. DOSSERT.

Witnesses:
WM. CORNELL BLANDING,
C. C. SCHOENECK.

It is hereby certified that in Letters Patent No. 1,234,857, granted July 31, 1917, upon the application of Carl H. Bissell and John J. Dossert, of Syracuse, New York, for an improvement in "Electrical Connections and Boxes," an error appears in the printed specification requiring correction as follows: Page 2, line 34, claim 2, strike out the words "and the bottom and the other a cap" and insert the syllables and words *trical connection in the box, the box;* and that the said Letters Patent should be read with this correction therein that the same may conform to the record of the case in the Patent Office.

Signed and sealed this 18th day of September, A. D., 1917.

[SEAL.]

R. F. WHITEHEAD,

*Acting Commissioner of Patents.*

Cl. 247—12.